United States Patent
Kuzmin (10) Patent No.: US 11,356,470 B2
(45) Date of Patent: Jun. 7, 2022

(54) METHOD AND SYSTEM FOR DETERMINING NETWORK VULNERABILITIES

(71) Applicant: Group IB TDS, Ltd, Moscow (RU)

(72) Inventor: Anton Dmitrievich Kuzmin, Snezhinsk (RU)

(73) Assignee: GROUP IB TDS, LTD, Moscow (RU)

( * ) Notice: Subject to any disclaimer, the term of this patent is extended or adjusted under 35 U.S.C. 154(b) by 166 days.

(21) Appl. No.: 17/019,730

(22) Filed: Sep. 14, 2020

(65) Prior Publication Data
US 2021/0194914 A1 Jun. 24, 2021

(30) Foreign Application Priority Data
Dec. 19, 2019 (RU) .......................... RU2019142440

(51) Int. Cl.
*H04L 9/40* (2022.01)
*G06F 16/955* (2019.01)
(Continued)

(52) U.S. Cl.
CPC ........ *H04L 63/1433* (2013.01); *G06F 9/4881* (2013.01); *G06F 16/955* (2019.01); *H04L 41/0631* (2013.01); *H04L 61/1511* (2013.01)

(58) Field of Classification Search
CPC ............. H04L 63/1433; H04L 41/0631; H04L 61/1511; G06F 16/955; G06F 9/4881
See application file for complete search history.

(56) References Cited

U.S. PATENT DOCUMENTS

| 7,225,343 B1 | 5/2007 | Honig et al. |
| 7,496,628 B2 | 2/2009 | Arnold et al. |

(Continued)

FOREIGN PATENT DOCUMENTS

| CN | 103491205 A | 1/2014 |
| CN | 104504307 A | 4/2015 |

(Continued)

OTHER PUBLICATIONS

Notice of Allowance with regard to the counterpart U.S. Appl. No. 16/239,605 dated Jan. 25, 2021.
(Continued)

*Primary Examiner* — Benjamin M Thieu
(74) *Attorney, Agent, or Firm* — BCF LLP (57) ABSTRACT

A method and a system for determining vulnerabilities on a network are provided. The method comprises: receiving data indicative of a first network architecture element; determining, based on the data, a respective one of a plurality of predetermined task templates, the respective one of the plurality of predetermined task templates including one or more tasks for identifying respective vulnerabilities associated with the first network architecture element; in response to identifying, based on the respective one of the plurality of predetermined task templates, at least one vulnerability associated with the first network architecture element, the at least one vulnerability providing access to a second network architecture element associated with the first network architecture element: determining data indicative of the second network architecture element; and using the data indicative of the second network architecture element for identifying further vulnerabilities on the network.

20 Claims, 4 Drawing Sheets

(51) Int. Cl.
  *G06F 9/48* (2006.01)
  *H04L 41/0631* (2022.01)
  *H04L 61/4511* (2022.01)

(56) References Cited

U.S. PATENT DOCUMENTS

| | | |
|---|---|---|
| 7,512,980 B2 | 3/2009 | Copeland et al. |
| 7,712,136 B2 | 5/2010 | Sprosts et al. |
| 7,730,040 B2 | 6/2010 | Reasor et al. |
| 7,865,953 B1 | 1/2011 | Hsieh et al. |
| 7,926,113 B1 | 4/2011 | Gula et al. |
| 7,930,256 B2 | 4/2011 | Gonsalves et al. |
| 7,958,555 B1 | 6/2011 | Chen et al. |
| 7,984,500 B1 | 7/2011 | Khanna et al. |
| 8,132,250 B2 | 3/2012 | Judge et al. |
| 8,151,341 B1 | 4/2012 | Gudov |
| 8,176,178 B2 | 5/2012 | Thomas et al. |
| 8,255,532 B2 | 8/2012 | Smith-Mickelson et al. |
| 8,260,914 B1 | 9/2012 | Ranjan |
| 8,285,830 B1 | 10/2012 | Stout et al. |
| 8,402,543 B1 | 3/2013 | Ranjan et al. |
| 8,448,245 B2 | 5/2013 | Banerjee et al. |
| 8,532,382 B1 | 9/2013 | Ioffe |
| 8,533,819 B2 | 9/2013 | Hoeflin et al. |
| 8,539,582 B1 | 9/2013 | Aziz et al. |
| 8,555,388 B1 | 10/2013 | Wang et al. |
| 8,561,177 B1 | 10/2013 | Aziz et al. |
| 8,578,491 B2 | 11/2013 | McNamee et al. |
| 8,600,993 B1 | 12/2013 | Gupta et al. |
| 8,612,463 B2 | 12/2013 | Brdiczka et al. |
| 8,625,033 B1 | 1/2014 | Marwood et al. |
| 8,635,696 B1 | 1/2014 | Aziz |
| 8,635,700 B2 | 1/2014 | Richard et al. |
| 8,650,080 B2 | 2/2014 | O'Connell et al. |
| 8,660,296 B1 | 2/2014 | Ioffe |
| 8,677,472 B1 | 3/2014 | Dotan et al. |
| 8,776,229 B1 | 7/2014 | Aziz |
| 8,839,441 B2 | 9/2014 | Saxena et al. |
| 8,850,571 B2 | 9/2014 | Staniford et al. |
| 8,856,937 B1 | 10/2014 | Wüest et al. |
| 8,972,412 B1 | 3/2015 | Christian et al. |
| 8,984,640 B1 | 3/2015 | Emigh et al. |
| 9,026,840 B1 | 5/2015 | Kim |
| 9,043,920 B2 | 5/2015 | Gula et al. |
| 9,060,018 B1 | 6/2015 | Yu et al. |
| 9,130,980 B2 | 9/2015 | Law et al. |
| 9,210,111 B2 | 12/2015 | Chasin et al. |
| 9,215,239 B1 | 12/2015 | Wang et al. |
| 9,253,208 B1 | 2/2016 | Koshelev |
| 9,292,691 B1 | 3/2016 | Hittel |
| 9,330,258 B1 | 5/2016 | Satish et al. |
| 9,338,181 B1 | 5/2016 | Burns et al. |
| 9,357,469 B2 | 5/2016 | Smith et al. |
| 9,456,000 B1 | 9/2016 | Spiro et al. |
| 9,654,593 B2 | 5/2017 | Garg et al. |
| 9,723,344 B1 | 8/2017 | Granström et al. |
| 9,736,178 B1 | 8/2017 | Ashley |
| 9,838,407 B1 | 12/2017 | Oprea et al. |
| 9,917,852 B1 | 3/2018 | Xu et al. |
| 9,934,376 B1 | 4/2018 | Ismael |
| 10,110,601 B1 | 10/2018 | Jakobsson et al. |
| 10,212,175 B2 | 2/2019 | Seul et al. |
| 10,284,595 B2 | 5/2019 | Reddy et al. |
| 10,326,777 B2 | 6/2019 | Demopoulos et al. |
| 10,440,050 B1 | 10/2019 | Neel et al. |
| 10,462,169 B2 | 10/2019 | Joseph et al. |
| 10,630,674 B2 | 4/2020 | Bell et al. |
| 10,721,262 B2 | 7/2020 | Zorlular et al. |
| 10,778,701 B2 | 9/2020 | Perilli |
| 10,873,597 B1 | 12/2020 | Mehra et al. |
| 2002/0161862 A1 | 10/2002 | Horvitz |
| 2003/0009696 A1 | 1/2003 | Bunker et al. |
| 2003/0028803 A1 | 2/2003 | Bunker et al. |
| 2004/0193918 A1 | 9/2004 | Green et al. |
| 2006/0074858 A1 | 4/2006 | Etzold et al. |
| 2006/0107321 A1 | 5/2006 | Tzadikario |
| 2006/0224898 A1 | 10/2006 | Ahmed |
| 2006/0253582 A1 | 11/2006 | Dixon et al. |
| 2007/0019543 A1 | 1/2007 | Wei et al. |
| 2007/0239999 A1 | 10/2007 | Honig et al. |
| 2008/0295173 A1 | 11/2008 | Tsvetanov |
| 2009/0077383 A1 | 3/2009 | de Monseignat et al. |
| 2009/0138342 A1 | 5/2009 | Otto et al. |
| 2009/0281852 A1 | 11/2009 | Abhari et al. |
| 2009/0292925 A1 | 11/2009 | Meisel |
| 2010/0011124 A1 | 1/2010 | Wei et al. |
| 2010/0037314 A1 | 2/2010 | Perdisci et al. |
| 2010/0076857 A1 | 3/2010 | Deo et al. |
| 2010/0115620 A1 | 5/2010 | Alme |
| 2010/0115621 A1 | 5/2010 | Staniford et al. |
| 2010/0154059 A1 | 6/2010 | McNamee et al. |
| 2010/0191737 A1 | 7/2010 | Friedman et al. |
| 2010/0205665 A1 | 8/2010 | Komili et al. |
| 2010/0228731 A1 | 9/2010 | Gollapudi |
| 2010/0235918 A1 | 9/2010 | Mizrahi et al. |
| 2011/0016533 A1 | 1/2011 | Zeigler et al. |
| 2011/0083180 A1 | 4/2011 | Mashevsky et al. |
| 2011/0222787 A1 | 9/2011 | Thiemert et al. |
| 2012/0030293 A1 | 2/2012 | Bobotek |
| 2012/0079596 A1 | 3/2012 | Thomas et al. |
| 2012/0087583 A1 | 4/2012 | Yang et al. |
| 2012/0158626 A1 | 6/2012 | Zhu et al. |
| 2012/0233656 A1 | 9/2012 | Rieschick et al. |
| 2012/0291125 A1 | 11/2012 | Maria |
| 2013/0086677 A1 | 4/2013 | Ma et al. |
| 2013/0103666 A1 | 4/2013 | Sandberg et al. |
| 2013/0111591 A1 | 5/2013 | Topan et al. |
| 2013/0117848 A1 | 5/2013 | Golshan et al. |
| 2013/0145471 A1 | 6/2013 | Richard et al. |
| 2013/0191364 A1 | 7/2013 | Kamel et al. |
| 2013/0263264 A1 | 10/2013 | Klein et al. |
| 2013/0297619 A1 | 11/2013 | Chandrasekaran et al. |
| 2013/0312097 A1 | 11/2013 | Turnbull |
| 2013/0340080 A1 | 12/2013 | Gostev et al. |
| 2014/0033307 A1 | 1/2014 | Schmidtler |
| 2014/0058854 A1 | 2/2014 | Ranganath et al. |
| 2014/0082730 A1 | 3/2014 | Vashist et al. |
| 2014/0173287 A1 | 6/2014 | Mizunuma |
| 2014/0250145 A1 | 9/2014 | Jones et al. |
| 2014/0310811 A1 | 10/2014 | Hentunen |
| 2014/0317754 A1 | 10/2014 | Niemela et al. |
| 2014/0380480 A1 | 12/2014 | Tang |
| 2015/0007250 A1 | 1/2015 | Dicato, Jr. et al. |
| 2015/0049547 A1 | 2/2015 | Kim |
| 2015/0067839 A1 | 3/2015 | Wardman et al. |
| 2015/0163242 A1 | 6/2015 | Laidlaw et al. |
| 2015/0170312 A1 | 6/2015 | Mehta et al. |
| 2015/0200962 A1 | 7/2015 | Xu et al. |
| 2015/0200963 A1 | 7/2015 | Geng et al. |
| 2015/0220735 A1 | 8/2015 | Paithane et al. |
| 2015/0295945 A1 | 10/2015 | Canzanese et al. |
| 2015/0363791 A1 | 12/2015 | Raz et al. |
| 2015/0381654 A1 | 12/2015 | Wang et al. |
| 2016/0036837 A1 | 2/2016 | Jain et al. |
| 2016/0036838 A1 | 2/2016 | Jain et al. |
| 2016/0044054 A1 | 2/2016 | Stiansen et al. |
| 2016/0055490 A1 | 2/2016 | Keren et al. |
| 2016/0065595 A1 | 3/2016 | Kim et al. |
| 2016/0080410 A1 | 3/2016 | Gorny et al. |
| 2016/0112445 A1 | 4/2016 | Abramowitz |
| 2016/0127907 A1 | 5/2016 | Baxley et al. |
| 2016/0142429 A1 | 5/2016 | Renteria |
| 2016/0149943 A1 | 5/2016 | Kaloroumakis et al. |
| 2016/0191243 A1 | 6/2016 | Manning |
| 2016/0205122 A1 | 7/2016 | Bassett |
| 2016/0205123 A1 | 7/2016 | Almurayh et al. |
| 2016/0226894 A1 | 8/2016 | Lee et al. |
| 2016/0253679 A1 | 9/2016 | Venkatraman et al. |
| 2016/0261628 A1 | 9/2016 | Doron et al. |
| 2016/0267179 A1 | 9/2016 | Mei et al. |
| 2016/0285907 A1 | 9/2016 | Nguyen et al. |
| 2016/0306974 A1 | 10/2016 | Turgeman et al. |
| 2016/0308898 A1 | 10/2016 | Teeple et al. |
| 2016/0359679 A1 | 12/2016 | Parandehgheibi et al. |

(56) References Cited

U.S. PATENT DOCUMENTS

| | | |
|---|---|---|
| 2016/0366099 A1 | 12/2016 | Jordan |
| 2017/0034211 A1 | 2/2017 | Buergi et al. |
| 2017/0078321 A1 | 3/2017 | Maylor et al. |
| 2017/0111377 A1 | 4/2017 | Park et al. |
| 2017/0134401 A1 | 5/2017 | Medvedovsky et al. |
| 2017/0142144 A1 | 5/2017 | Weinberger et al. |
| 2017/0149813 A1 | 5/2017 | Wright et al. |
| 2017/0200457 A1 | 7/2017 | Chai et al. |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0264627 A1 | 9/2017 | Hunt et al. |
| 2017/0272471 A1 | 9/2017 | Veeramachaneni et al. |
| 2017/0279818 A1 | 9/2017 | Milazzo et al. |
| 2017/0286544 A1 | 10/2017 | Hunt et al. |
| 2017/0289187 A1 | 10/2017 | Noel et al. |
| 2017/0295157 A1 | 10/2017 | Chavez et al. |
| 2017/0295187 A1 | 10/2017 | Havelka et al. |
| 2017/0324738 A1 | 11/2017 | Hari et al. |
| 2017/0346839 A1 | 11/2017 | Peppe et al. |
| 2018/0012021 A1 | 1/2018 | Volkov |
| 2018/0012144 A1 | 1/2018 | Ding et al. |
| 2018/0034779 A1 | 2/2018 | Ahuja et al. |
| 2018/0063190 A1 | 3/2018 | Wright et al. |
| 2018/0096153 A1 | 4/2018 | Dewitte et al. |
| 2018/0115573 A1 | 4/2018 | Kuo et al. |
| 2018/0152471 A1 | 5/2018 | Jakobsson |
| 2018/0268464 A1 | 9/2018 | Li |
| 2018/0307832 A1 | 10/2018 | Ijiro et al. |
| 2018/0309787 A1 | 10/2018 | Evron et al. |
| 2019/0089737 A1 | 3/2019 | Shayevitz et al. |
| 2019/0207973 A1 | 7/2019 | Peng |
| 2019/0373005 A1 | 12/2019 | Bassett |
| 2020/0134702 A1 | 4/2020 | Li |

FOREIGN PATENT DOCUMENTS

| | | |
|---|---|---|
| CN | 105429955 A | 3/2016 |
| CN | 105429956 A | 3/2016 |
| CN | 105897714 A | 8/2016 |
| CN | 106131016 A | 11/2016 |
| CN | 106506435 A | 3/2017 |
| CN | 106713312 A | 5/2017 |
| CN | 107392456 A | 11/2017 |
| EP | 1160646 A2 | 12/2001 |
| EP | 2410452 B1 | 1/2016 |
| GB | 2493514 A | 2/2013 |
| KR | 10-2007-0049514 A | 5/2007 |
| KR | 10-1514984 B1 | 4/2015 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 164629 U1 | 9/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2634209 C1 | 10/2017 |
| RU | 2636702 C1 | 11/2017 |
| RU | 2670906 C9 | 12/2018 |
| RU | 2681699 C1 | 3/2019 |
| RU | 2722693 C1 | 6/2020 |
| RU | 2738335 C1 | 12/2020 |
| WO | 0245380 A2 | 6/2002 |
| WO | 2009/026564 A1 | 2/2009 |
| WO | 2011/045424 A1 | 4/2011 |
| WO | 2012/015171 A2 | 2/2012 |
| WO | 2019/010182 A1 | 1/2019 |
| WO | WO-2019004503 A1 * | 1/2019 ............ G06F 21/57 |
| WO | 2019/153384 A1 | 8/2019 |

OTHER PUBLICATIONS

English Abstract of RU107616 retrieved on Espacenet on Jul. 3, 2017.

European Search Report with regard to EP17180099 completed on Nov. 28, 2017.

European Search Report with regard to EP17191900 completed on Jan. 11, 2018.

Yoshioka et al., "Sandbox Analysis with Controlled Internet Connection for Observing Temporal Changes of Malware Behavior", https://www.researchgate.net/publication/254198606, 15 pages.

Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, pp. 210-218.

Wikipedia, "Blockchain", https://en.wikipedia.org/wiki/Blockchain, pdf document, 18 pages.

Search Report with regard to the counterpart RU Patent Application No. 2018101764 completed Jun. 29, 2018.

Search Report with regard to the counterpart RU Patent Application No. 2018101761 completed Jun. 20, 2018.

International Search Report with regard to the counterpart Patent Application No. PCT/RU2016/000526 dated Jun. 1, 2017.

European Search Report with regard to the counterpart EP Patent Application No. EP17210904 completed May 16, 2018.

Search Report with regard to the counterpart RU Patent Application No. 2018101759 completed Sep. 7, 2018.

English Abstract of RU129279 retrieved on Espacenet on Sep. 11, 2017.

English Abstract of RU164629 retrieved on Espacenet on Sep. 11, 2017.

English Abstract of RU2538292 retrieved on Espacenet on Sep. 11, 2017.

Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.

Search Report with regard to the counterpart Patent Application No. RU2018105377 completed Oct. 15, 2018.

Search Report with regard to the counterpart RU Patent Application No. 2018101763 completed Jan. 11, 2019.

Search Report with regard to the counterpart RU Patent Application No. 2016137336 completed Jun. 6, 2017.

English Abstract of RU2522019 retrieved on Espacenet on Jan. 25, 2019.

Search Report with regard to the counterpart RU Patent Application No. 2017140501 completed Jul. 11, 2018.

English Translation of CN106713312, © Questel—FAMPAT, Jul. 17, 2019.

English Translation of CN105897714, © Questel—FAMPAT, Jul. 17, 2019.

English Translation of CN106506435, © Questel—FAMPAT, Jul. 26, 2019.

English Translation of CN107392456, © Questel—FAMPAT, Jul. 29, 2019.

English Translation of CN103491205, © Questel—FAMPAT, Jul. 29, 2019.

English Translation of CN106131016, © Questel—FAMPAT, Jul. 17, 2019.

Invitation to Respond to Written Opinion dated Aug. 5, 2019 with regard to the counterpart SG Patent Application No. 10201900339Q.

Invitation to Respond to Written Opinion dated Aug. 5, 2019 with regard to the counterpart SG Patent Application No. 10201901079U.

(56) References Cited

OTHER PUBLICATIONS

Invitation to Respond to Written Opinion dated Jul. 31, 2019 with regard to the counterpart SG Patent Application No. 10201900335P.
Search Report with regard to the counterpart RU Patent Application No. 2018144708 completed Aug. 16, 2019.
Search Report with regard to the counterpart RU Patent Application No. 2018147431 completed Aug. 15, 2019.
English Translation of KR10-2007-0049514 (Description, Claims) retrieved on Espacenet on Oct. 15, 2019.
English Abstract of KR10-1514984 retrieved on Espacenet on Oct. 15, 2019.
Office Action with regard to the counterpart U.S. Appl. No. 16/261,854 dated Oct. 21, 2019.
Notice of Allowance with regard to the counterpart U.S. Appl. No. 15/707,641 dated Oct. 30, 2019.
Whyte, "DNS-based Detection of Scanning Worms in an Enterprise Network", Aug. 2004, NOSS, pp. 1-17 (Year 2005)—Notice of Allowance with regard to the counterpart U.S. Appl. No. 15/707,641.
Office Action with regard to the counterpart U.S. Appl. No. 15/858,013 dated Nov. 22, 2019.
Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN105429956 retrieved on Espacenet on Jan. 7, 2020.
English Abstract for CN104504307 retrieved on Espacenet on Jan. 7, 2020.
Office Action received with regard to the counterpart U.S. Appl. No. 15/858,032 dated Apr. 6, 2020.
Office Action with regard to the counterpart U.S. Appl. No. 16/270,341 dated May 27, 2020.
Notice of Allowance with regard to the counterpart U.S. Appl. No. 15/858,013 dated May 8, 2020.
English Abstract for CN105429955 retrieved on Espacenet on Jul. 13, 2020.
European Search Report with regard to the counterpart EP Patent Application No. EP17211131 completed Apr. 12, 2018.
Search Report with regard to the counterpart RU Patent Application No. 2018101760 completed Jun. 22, 2018.
Office Action with regard to the counterpart U.S. Appl. No. 15/707,641 dated Apr. 25, 2019.
Notice of Allowance with regard to the counterpart U.S. Appl. No. 15/858,013 dated Jun. 10, 2020.
Office Action with regard to the counterpart U.S. Appl. No. 16/270,341 dated Dec. 4, 2020.
Search Report with regard to the counterpart RU Patent Application No. 2021116850 completed Feb. 17, 2022.
International Search Report and Written Opinion with regard to PCT/RU2020/000044 dated Oct. 15, 2020.
Search Report with regard to the counterpart RU Patent Application No. 2019142440 completed Oct. 26, 2020.
Search Report with regard to the counterpart RU Patent Application No. 2020103269 dated Mar. 24, 2020.
Notice of Allowance with regard to the counterpart U.S. Appl. No. 16/270,341 dated Mar. 25, 2021.

* cited by examiner

METHOD AND SYSTEM FOR DETERMINING NETWORK VULNERABILITIES

CROSS-REFERENCE

The present application claims priority to Russian Patent Application No. 2019142440, entitled "METHOD AND SYSTEM FOR DETERMINING NETWORK VULNERABILITIES," filed on Dec. 19, 2019, the entirety of which is incorporated herein by reference.

TECHNICAL FIELD

The present technology broadly relates to the area of information security; and in particular, to remote scanning network architecture elements.

BACKGROUND

Scanners are hardware or software tools used for diagnostics and monitoring a network and structural nodes thereof (also referred to herein as "network architecture elements"). These tools can be configured to scan networks, computers and applications run thereon for possible security issues, and evaluate and report identified information in order to prevent future occurrences of the vulnerabilities.

Modem scanners may be applied to various segments of the network enabling to obtain comprehensive information about a current security status thereof. Due to distributed architecture, all data about identified vulnerabilities and flaws may be consolidated in a single location. Therefore, it may be possible to track changes in the network by automatically comparing the scanned data at different moments in time, and by constantly monitoring the changes.

Certain prior art approaches are directed to specific implementations of such scanners.

Chinese Patent No.: CN 105,429,955-B issued on Dec. 11, 2018 and entitled "A Kind of Detection Method of Long-Range Loophole" discloses The invention discloses a kind of detection methods of long-range loophole, include: first step creation scan node: clicking addition task in scanner home page first, python code is replicated in one column of node, is run in python environment on the server as node, can be created node; Second step adds scan address: the network address scanned will be needed to be added in scan box in one column of addition task, and selects Scanning Options, addition task can be completed; Third step opens scanning: the option that selection needs to scan on one column of option after the addition was complete, click start to be scanned. 4th step checks scanning result: can obtain the loophole list of targeted website after the completion of scanning, contain the detailed vulnerability information of targeted website.

United States Pantent Application Publication No.: 2004/0193918-A1 published on Sep. 30, 2004, assigned to Trustwave Holdings Inc., and entitled "Apparatus and Method for Network Vulnerability Detection and Compliance Assessment" discloses an apparatus and method for detecting vulnerabilities in networks. In particular, the present invention may relate to an apparatus and method for detecting network security flaws in a computer network. The types of computer networks which the present invention may aid in protecting include both local area and other private networks, and networks connected to the internet or a similar wide area public network.

PCT Patent Application Publication No.: WO 2019/153384-A1 published on Aug. 15, 2019 and entitled "Vulnerability Scanning Method and System, and Server" discloses a vulnerability scanning method and system, and a server. The method comprises: recognizing a host service running in a target host and establishing a scanning task adapting to the recognized host service; distributing the established scanning task to a task scheduling center so that a proxy node obtains at least one scanning task from the task scheduling center, the scanning result being obtained after executing, by the proxy node, the at least one scanning task for the target host; and receiving the scanning result fed back by the proxy node and determining whether a designated host service exists in the recognized host service, the designated host service being used for indicating whether a website resource runs in the target host; if yes, re-distributing the scanning sub-task corresponding to the designated host service to the task scheduling center. The technical solution provided by the present application can improve the vulnerability scanning precision.

SUMMARY

It is an object of the present technology to ameliorate at least some of the shortcomings present in the prior art.

Developers of the present technology have realized that the prior art approaches lack flexibility as most of them require predetermined tasks for scanning the network for detection a specific vulnerability (or a specific set thereof) therein. Further, some of the known approaches require manual selection of the tasks.

Thus, the developers have devised methods and systems for determining vulnerabilities associated with network architecture elements of the network based on respective task templates having been automatically determined therefor. More specifically, non-limiting embodiments of the present technology are directed to iteratively determining network architecture elements and vulnerabilities therein, based on previously identified vulnerabilities.

For example, for identifying vulnerabilities associated with a given network architecture element, a respective task template may be used, which has automatically been pre-configured for detecting vulnerabilities associated specifically with this given network architecture element. The detected vulnerabilities may further be indicative of links between the given network architecture element and some other ones, which can thus be verified for further potential vulnerabilities using a different task template. By doing so, the determining further network architecture elements and examining thereof for potential vulnerabilities continue until no further vulnerability can be identified.

Therefore, according to a first broad aspect of the present technology, there is provided a method for determining vulnerabilities on a network. The method being executable by a processor. The method comprising: receiving, by the processor, data indicative of a first network architecture element; determining, by the processor, based on the data indicative of the first network architecture element, a respective one of a plurality of predetermined task templates, the respective one of the plurality of predetermined task templates including one or more tasks executable for identifying respective vulnerabilities associated with the first network architecture element; in response to identifying, based on the respective one of the plurality of predetermined task templates, at least one vulnerability associated with the first network architecture element, the at least one vulnerability providing access to a second network architecture element associated with the first network architecture element: determining, by the processor, data indicative of the second network architecture element; storing, by the processor, the data indicative of the second network architecture element in a database; and using, by the processor, the data indicative of the second network architecture element for identifying further vulnerabilities on the network.

In some implementations of the method, the first network architecture element is associated with a first network architecture element type comprising at least one of: an IP address, a website, a Uniform Resource Locator (URL), a domain name, and a network port.

In some implementations of the method, if the first network architecture element type is the domain name, the method further comprises verifying, by the processor, availability of the domain name using a WHOIS web service.

In some implementations of the method, the method further comprises determining, by the processor, using the WHOIS web service, registration data associated with an owner of the domain name.

In some implementations of the method, the verifying the availability of the domain name further comprises analyzing, by the processor, data responsive to requests for random subdomain names associated with the domain name.

In some implementations of the method, if the first network architecture element type is the website, the method further comprises verifying, by the processor, availability of the website, the verifying comprising establishing a connection with the website, the connection being one of a direct connection and a connection via a proxy server.

In some implementations of the method, if the first network architecture element type is the URL, the method further comprises verifying availability of the URL, the verifying comprising transmitting, by the processor, at least one request to a webserver associated with the URL, and the verifying further comprising at least one of: analyzing a response code of a response received from the webserver associated with the URL; a content associated with the response; a header of the response; and a type of the URL, wherein the type of the URL is associated with one of a file, a directory, and underdetermined.

In some implementations of the method, the verifying the availability of the URL further comprises determining at least one of: if the URL is responsive to requests for non-existing files; if the URL is associated with a predetermined exclusion template; if the webserver associated with the URL is configured to redirect the at least one request to at least one an other URL, and determining the at least one an other URL.

In some implementations of the method, the data indicative of the first network architecture element is received from one of: a user input and the database.

In some implementations of the method, the the respective one of the plurality of predetermined task templates is associated with a plurality of network architecture element types, to which the respective one of the plurality of predetermined task templates is applicable.

In some implementations of the method, the one or more tasks comprise at least one of: tasks for identifying subdomain names; tasks for identifying URLs; tasks for identifying open network ports; tasks for retrieving information of at least one web service associated with the open network ports; tasks for password mining for accessing the at least one web service associated with the open network ports; and tasks for identifying vulnerabilities associated with the at least one web service.

In some implementations of the method, the method further comprises: receiving, by the processor, the data indicative of the second network architecture element; determining, by the processor, based on the data indicative of the second network architecture element, an other one of the plurality of predetermined task templates, the other one of the plurality of predetermined task templates including one or more tasks executable for identifying respective vulnerabilities associated with the second network architecture element; in response to identifying, based on the other one of the plurality of predetermined task templates, at least one vulnerability associated with the second network architecture element, the at least one vulnerability providing access to a third network architecture element associated with the second network architecture element: determining, by the processor, data indicative of the third network architecture element; storing, by the processor, the data indicative of the third network architecture element in the database; and using, by the processor, the data indicative of the third network architecture element for identifying further vulnerabilities on the network.

In some implementations of the method, the method further comprises iteratively repeating at least the steps of the receiving data and the determining a predetermined task template until no further vulnerability is identified.

In some implementations of the method, the method further comprises generating, at each iteration, an intermediate report including data of vulnerabilities having been identified on the network.

In some implementations of the method, the other one of the plurality of predetermined task templates is a same as the respective one of the plurality of predetermined task templates.

In some implementations of the method, the other one of the plurality of predetermined task templates is at least partially different from the respective one of a plurality of predetermined task templates.

According to a second broad aspect of the present technology, there is provided a system for determining vulnerabilities on a network. The system comprises a computing device. The computing device further comprises: a processor; a non-transitory computer-readable medium comprising instructions. The processor, upon executing the instructions, is configured to: receive data indicative of a first network architecture element; determine based on the data indicative of the first network architecture element, a respective one of a plurality of predetermined task templates, the respective one of the plurality of predetermined task templates including one or more tasks executable for identifying respective vulnerabilities associated with the first network architecture element; in response to identifying, based on the respective one of the plurality of predetermined task templates, at least one vulnerability associated with the first network architecture element, the at least one vulnerability providing access to a second network architecture element associated with the first network architecture element: determine data indicative of the second network architecture element; store the data indicative of the second network architecture element in a database; and use the data indicative of the second network architecture element for identifying further vulnerabilities on the network.

In some implementations of the system, the processor is further configured to: receive the data indicative of the second network architecture element; determine, based on the data indicative of the second network architecture element, an other one of the plurality of predetermined task templates, the other one of the plurality of predetermined task templates including one or more tasks executable for identifying respective vulnerabilities associated with the second network architecture element; in response to identifying, based on the other one of the plurality of predetermined task templates, at least one vulnerability associated with the second network architecture element, the at least one vulnerability providing access to a third network architecture element associated with the second network architecture element: determine data indicative of the third network architecture element; store the data indicative of the third network architecture element in the database; and use the data indicative of the third network architecture element for identifying further vulnerabilities on the network.

In some implementations of the system, the processor is further configured to iteratively repeat at least the steps of the receiving data and the determining a predetermined task template until no further vulnerability is identified.

In some implementations of the system, the processor is further configured to generate, at each iteration, an intermediate report including data of vulnerabilities having been identified on the network.

In the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF DRAWINGS

Non-limiting embodiments of the present technology are described herein with reference to the accompanying drawings; these drawings are only presented to explain the essence of the invention and are not limiting the scope of the present technology in any way, where.

DETAILED DESCRIPTION

The following detailed description is provided to enable any one skilled in the art to implement and use the non-limiting embodiments of the present technology. Specific details are provided merely for descriptive purposes and to give insights into the present technology, and no way as a limitation. However, it would be apparent for a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Certain non-limiting embodiments of the present technology are directed to systems and methods for identifying vulnerabilities associated with network architecture elements of a network.

According to certain non-limiting embodiments of the present technology, a process for identifying vulnerabilities associated with a given network architecture element may be broken down into four stages: (1) data collection, (2) binding, (3) evaluation, and (4) penetration.

According to certain non-limiting embodiments of the present technology, at the data collection stage, via scanning the network, a plurality of network architecture elements, such as network devices, may be identified. Further, at the binding and evaluation stages a given network architecture element, for example, running a certain service or application may be identified. Further, the given network architecture element may be examined for possible vulnerabilities. Finally, at the penetration stage, the so identified vulnerabilities may further be used to determine other network architecture elements, associated with the given one, within which further vulnerabilities may be identified.

Figure 1:
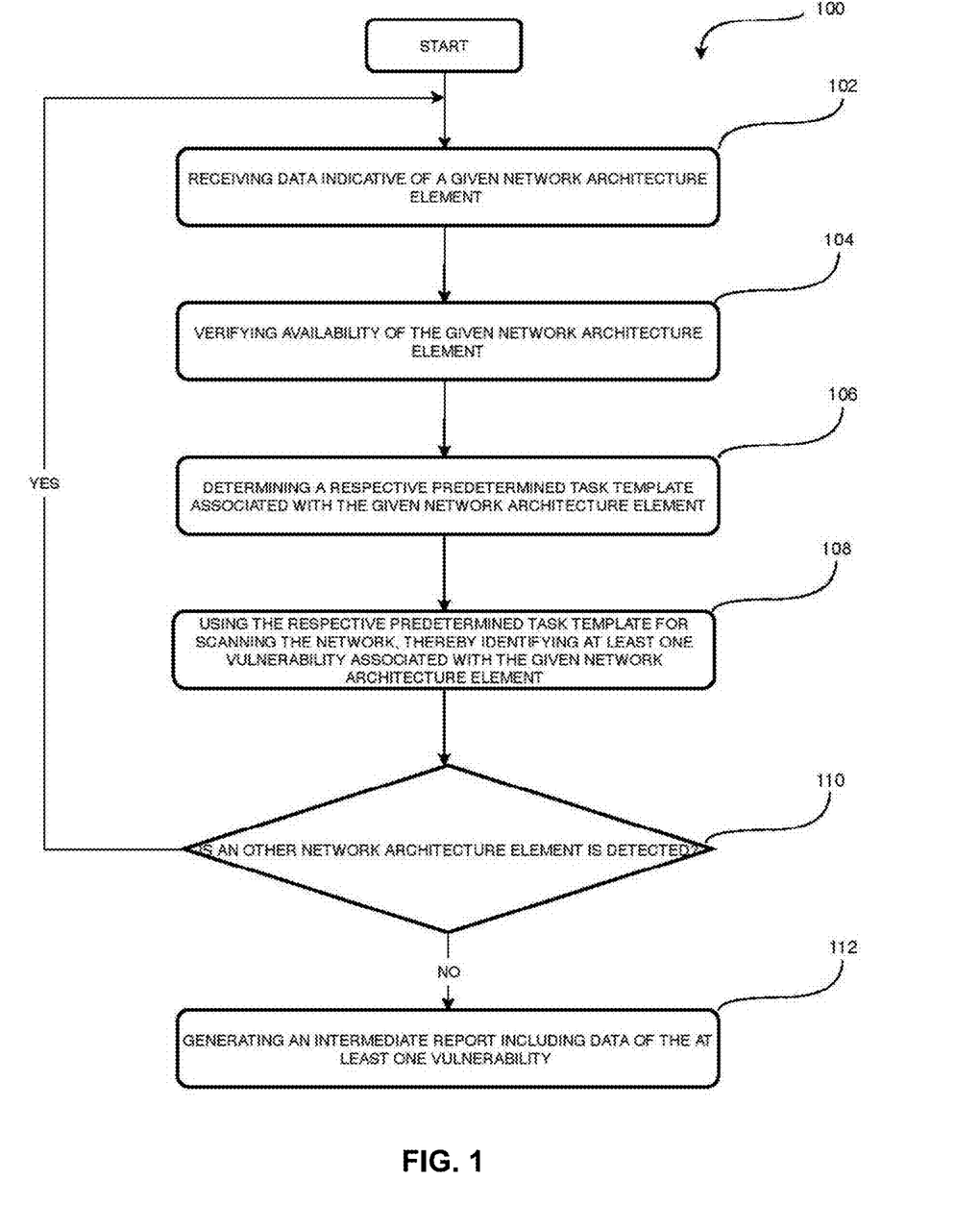
FIG. 1 depicts a flowchart diagram of an example sequence of steps executed for scanning a network for determining vulnerabilities associated with a given network architecture element, in accordance with certain non-limiting embodiments of the present technology.

With reference to FIG. 1, there is depicted a flowchart diagram of a method 100 of scanning a network for determining vulnerabilities associated with a given network architecture element, in accordance with certain non-limiting embodiments of the present technology. The method 100 may be executed by a processor of a computing device (such as a computing device 400 of FIG. 4), description of which is provided below.

Step 102: Receiving Data Indicative of a Given Network Architecture Element

At step 102, according to certain non-limiting embodiments of the present technology, the processor may be configured to receive data indicative of the given network architecture element, thereby identifying it within the network.

In some non-limiting embodiments of the present technology, the given network architecture element may be associated with at least one of the following network architecture element types: an IP address, a website, a Universal Resource Locator (URL), a domain name, a network port.

In some non-limiting embodiments of the present technology, the processor may be configured to receive the data indicative of the given network architecture element via a user input, for example, from an operator of the network. In other non-limiting embodiments of the present technology, the processor may be configured to receive the data indicative of the given network architecture element from a database of network architecture elements communicatively coupled therewith. In some non-limiting of the present technology, the database of the network architecture elements is used for storing all newly identified network architecture elements on the network by the processor executing the method 100, as will become apparent from the description herein below.

The method 100 thus proceeds to step 104.

Step 104: Verifying Availability of the Given Network Architecture Element

At step 104, the processor may further be configured to verify availability of the given network architecture elements, which may differ, according to certain non-limiting embodiments of the present technology, depending on an associated network architecture element type thereof.

In some non-limiting embodiments of the present technology, if the associated network architecture element type is the IP address, it is only checked for availability.

Further, in other non-limiting embodiments of the present technology, if the associated network architecture element type is the domain name, the processor may be configured to verify availability thereof via a WHOIS web service. By doing so, the processor may further be configured to retrieve, via the WHOIS web service, registration data associated with the domain name, such as information of an owner of the domain name. In additional non-limiting embodiments of the present technology, the processor may further be configured to verify the availability of the domain name by submitting requests for random subdomain names associated with the domain name and analyzing respective responses.

In yet other non-limiting embodiments of the present technology, where the associated network architecture element type is the website, the processor may be configured to verify availability thereof by establishing a connection therewith. In these embodiments, the connection may be established directly or via a proxy server, as an example.

Finally, in those non-limiting embodiments of the present technology, where associated network architecture element type is the URL, the processor may be configured to verify availability thereof by submitting a request to a webserver associated with the URL. Further, upon receiving a response from the webserver associated with the URL, the processor may be configured to analyze at least some of the following information associated with the response in order to verify the availability of the URL: a response code of the response; a content of the response; and a header of the response. Finally, the processor may be configured to determine a type of the URL, which, according to certain non-limiting embodiments of the present technology, may be at least one of: a file, a directory, and undetermined. Additionally, the processor may be configured to determine whether or not the URL responds to requests for non-existing files; whether the URL is associated with an predetermined exclusion task template; and whether or not the webserver associated with the URL is configured to redirect requests submitted by the processor, and if this is the case—the processor may further be configured to determine a URL associated with the redirection.

The method 100 thus proceeds to step 104.

Step 104: Determining a Respective Predetermined Task Template Associated with the Given Network Architecture Element According to certain non-limiting embodiments of the present technology, at step 104, the processor may be configured to determine tasks for scanning the given network architecture element for determining potential vulnerabilities associated therewith.

To that end, in some non-limiting embodiments of the present technology, the processor may be configured to apply a respective predetermined task template including tasks configured for scanning the given network architecture element for detecting vulnerabilities associated therewith.

Figure 2:
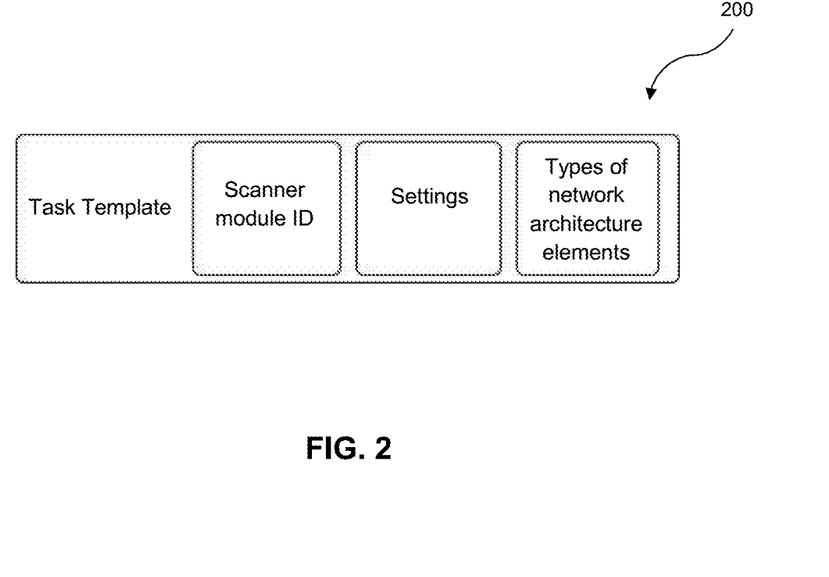
FIG. 2 depicts a schematic diagram of a predetermined task template used for determining vulnerabilities associated with the given network architecture element, in accordance with certain non-limiting embodiments of the present technology.

With reference to FIG. 2, according to certain non-limiting embodiments of the present technology, a predetermined task template 200 may be associated with at least one of: an ID of a scanning module (such as a given scanning module 306 of FIG. 3), at which the predetermined task template 200 is to be executed; settings associated with launching the scanning module; and types of network architecture elements, to which the predetermined task template may be applied. The types of network architecture elements, to which the predetermined task template 200 may be applied, can typically be defined by tasks associated therewith as the associated tasks can typically be configured to target specific vulnerabilities associated with respective types of network architecture elements as will become apparent from the description below.

According to certain non-limiting embodiments of the present technology, the predetermined task template 200 may be updated. For example, a user may modify predetermined task template 200 and create new templates based thereon, as needed. In additional non-limiting embodiments of the present technology, multiple users may modify predetermined task template 200 simultaneously, for example, by adding additional tasks therein, such as those associated with different types of network architecture elements to be scanned or extending a range of tasks for scanning the given network architecture element, modify the settings of the scanning, etc., without causing conflicts among actions thereof.

According to some non-limiting embodiments of the present technology, the processor may be configured to have access to a plurality of such predetermined task templates for further selecting at least respective one therefrom for determining vulnerabilities associated with various network architecture elements on the network.

The method 100 thus advances to step 108.

Step 108: Using the Respective Predetermined Task Template for Scanning the Network, Thereby Identifying at Least One Vulnerability Associated with the Given Network Architecture Element With reference to FIG. 3, there is depicted an example configuration of a scanning system 300, in accordance with certain non-limiting embodiments of the present technology.

Figure 3:
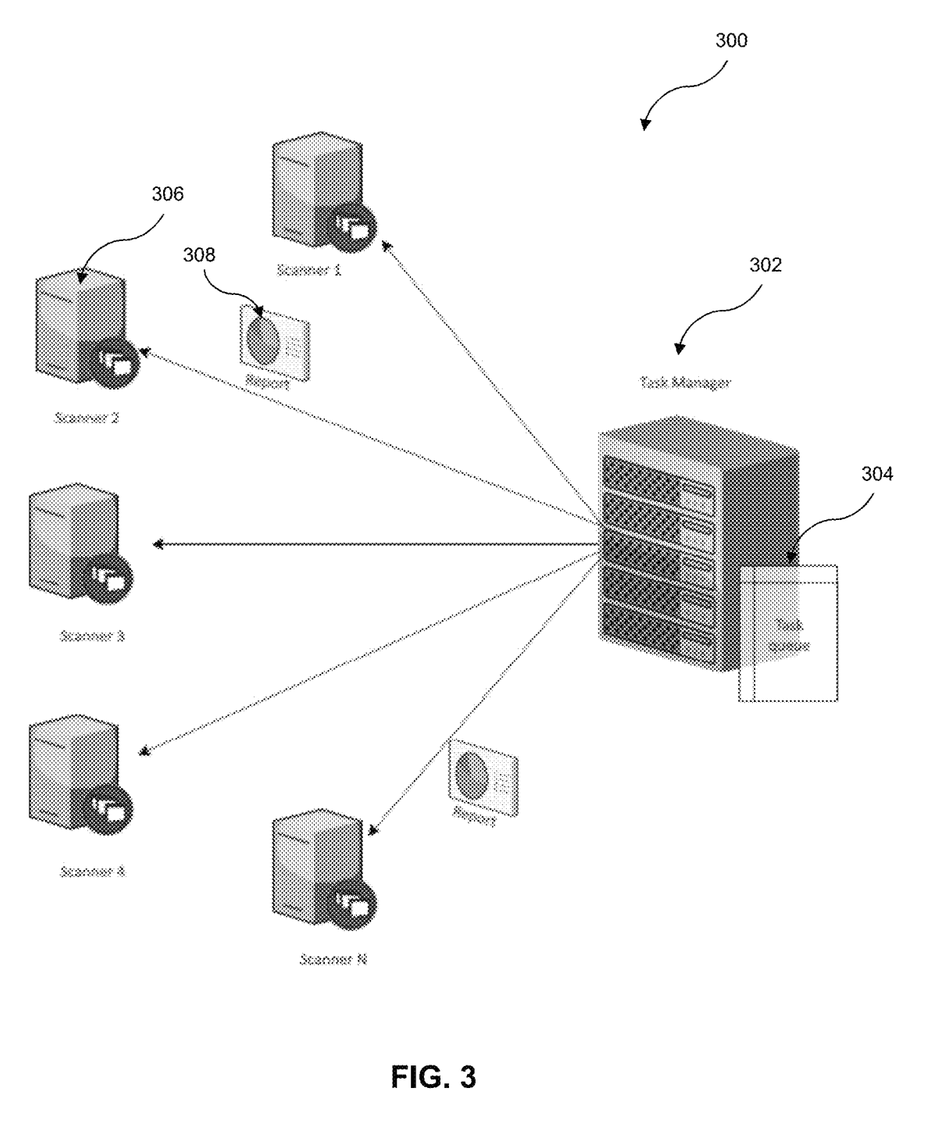
FIG. 3 depicts a schematic diagram of a process of using the predetermined task template of FIG. 2 by a task manager module for scanning the network, in accordance with certain non-limiting embodiments of the present technology.

At step 108, once the predetermined task template 200 is ready to be used for scanning, the processor may be configured to transmit it to a task manager module 302, with which the processor is communicatively coupled. Further, after receiving the predetermined task template 200, the task manager module 302 may be configured to arrange tasks therein, for example, according to their priority, thereby forming a task queue 304.

Finally, as it can be appreciated, the task manager module 302, may be configured to transmit the tasks from the task queue 304 to one of a plurality of scanning modules, such as a given scanning module 304.

According to certain non-limiting embodiments of the present technology, the given scanning module 304 may be scaled up for different networks and operating frameworks; it also may be scaled up for different ranges of network architecture elements.

In some non-limiting embodiments of the present technology, scalability of the scanning system 300 may be controlled by the task manager module 302 and by tasks running on scanning modules. For example, the scalability of the scanning system 300 may be achieved by isolating the task manager module 302 from each of the scanning modules. Besides, the scanning modules may be associated with a plurality scanning tools, therefore it would be possible to use a large number of commercial, open source, proprietary, and other tools to scan the network for vulnerabilities. By doing so, certain non-limiting embodiments of the present technology may allow improving flexibility of the scanning system 300, as well as reducing scanning time, thereby saving computational resources of the scanning system 300 and the processor.

Thus, according to certain non-limiting embodiments of the present technology, in order to execute one or more tasks received from the task manager module 302, the given scanning module 304 may be configured, by the processor, to execute (or otherwise, have access to) one or more network security tools.

Below, there is provided an example list of network security tools executable by the given scanning module 304 for executing one or more tasks, according to certain non-limiting embodiments of the present technology. It should be expressly understood that the present example list of network security tools is not exhaustive, and in additional non-limiting embodiments of the present technology, may include other network security tools currently used for executing tasks associated with scanning networks for vulnerabilities.

Network Mapper (Nmap) may be used at the data collection stage to scan in real time for currently active systems within a given network. Nmap also allows locating a access control list (ACL) of a router or firewall rules by checking an associated acknowledgment flag (ACK) and using other methods. At the binding and evaluation stages, Nmap may be used to scan network ports, to enumerate identified services and their version numbers, and to collect information on operating systems (insecure.org/nmap).

Patator is a multipurpose and flexible brute-force tool with modular architecture. One of specific features of this tool: a reduced number of false positives due to decisions being based upon the following attributes: a response status code, a response size, matching a string or a regular expression in the response. Also, this network security tool has a modular design, and thus may be scaled up; supports interactive execution; uses permanent connections; multithreading (github.com/lanjelot/patator).

OpenVAS is a network security toll relating to vulnerability scanners. This network security tool uses its own CVE database to scan networks and systems for possible vulnerabilities. OpenVAS may be said to be a primary service with full control over vulnerabilities, with policy management, scanning schedule, detection of false positives, and generating reports in various formats (XML, HTML, LateX, etc.). Scanners are managed using the OTP protocol (OpenVAS Transfer Protocol). The tool itself may also receive commands using an XML-like OpenVAS Management Protocol (OMP). All settings and all collected data may be stored in a centralized SQL database (SQLite) (openvas.org).

Web-scout (WS) is a toolset of network security tools to collect information about web applications and websites during penetration testing. It is distributed under the MIT license. This tools may be used for: search for subdomains (dictionary lookup, wildcard lookup or both, in regular zones, in wildcard zones (by ignoring the IP address or based upon a HTTP request)); search for URLs: dictionary lookup, wildcard lookup or both, or using permutations of known URLs; simple queries (GET/POST/HEAD); with various "not found" codes (!=404); determine positive/negative results using regular expressions, determine the "not found" response by its size; use a real browser to circumvent anti-bot protection; use proxy servers or TOR; search for URL parameters (in GET/POST/FILES/COOKIE, dictionary lookup, wildcard lookup or both, with various "not found" codes (!=404), determine negative responses using regular expressions, determine the "not found" response by its size); iterate through forms: regular POST, use a real browser to circumvent anti-bot protection; search for virtual hosts (dictionary lookup, wildcard lookup or both); fuzzing URL parameters and HTTP headers (github.com/AntonKuzminRussia/webscout/blob/master/README_R-U.md).

In some non-limiting embodiments of the present technology, certain network security tools listed above may be used as scanning modules. In these embodiments, the network security tools can be stored in Docker containers on a remote server (not depicted) and may be accessed by the processor as needed.

In specific non-limiting embodiments of the present technology, the network security tools may be stored on the remote server based on their functionality. In other non-limiting embodiments of the present technology, the network security tools may be stored on the remote server based on associated predetermined task templates.

Needless to say that, in various non-limiting embodiments of the present technology, the given scanning module 306 may be configured to access more than one network security tools simultaneously—that is, a predetermined combination thereof.

With continued reference to FIG. 3, according to certain non-limiting embodiments of the present technology, the task manager module 302 processes the predetermined task template 200 to select scanning modules corresponding to the tasks included therein. Further, the task manager module 302 may be configured to transmit the tasks to each of the associated scanning modules—such as the given scanning module 306.

In some non-limiting embodiments of the present technology, the task manager module 302 may store a list of scanning modules coupled therewith as well as data about their current utilization. The data about utilization of the scanning modules can be, in turn, provided by the scanning modules. According to certain non-limiting embodiments of the present technology, if there is at least one scanning module with less than 100% utilization, the task manager module 302 would add tasks to the task queue 304. Then, available scanning modules may be configured to request the tasks from the task queue 304 based on the "first come, first served" principle, and execute the task by using one or more network security tools as described above.

As also mentioned above, the predetermined task template 200 may include one or more tasks depending on an associated type of the given network architecture element to be scanned. Below, there is provided an example non-exhaustive list of types of tasks that may be associated with the predetermined task template 200.

1. Tasks for identifying subdomain names. According to certain non-limiting embodiments of the present technology, these asks may include tasks for dictionary-based search for subdomains (sets of names as text lists) and for wildcard-based search (all possible combinations of certain groups of characters, with certain length e. g. a-z+0-9, 1 to 4 characters long).

Typically, in certain non-limiting embodiments of the present technology, there are two ways to run this scanning:
   A regular query for subdomains on DNS servers. This method nay be used when a DNS zone sends a negative response to non-existing names.
   A query to a DNS server followed by a HTTP request to a returned IP address. This method may be used for wildcard zones when any subdomain query returns a positive response.

2. Tasks for identifying URLs. According to certain non-limiting embodiments of the present technology, these asks may include tasks for dictionary-based search for URLs (sets of names as text lists) and for wildcard-based search (all possible combinations of certain groups of characters, with certain length e. g. a-z+0-9, 1 to 4 characters long).

Also, the tasks for identifying URLs may be based on the sets which are generated using the known URLs of a website (e.g. if the last character of a URL is a digit, all its versions with the modified last digit are going to be checked).

3. Tasks for identifying open network ports. According to certain non-limiting embodiments of the present technology, to execute such tasks, the processor may be configured to use a standard TCP connection.

4. Tasks for retrieving information of at least one web service associated with the open network ports. According to certain non-limiting embodiments of the present technology, to run these tasks, the processor may be configured to query each of the services to determine their respective versions and other data.

5. Tasks for brute-force password mining (similar to the aforementioned). In some non-limiting embodiments of the present technology, if a given service has been previously identified, the processor may be configured to attempt to connect with it and authorize therewith using a pre-determined list of usernames and passwords.

4. Tasks for identifying vulnerabilities associated with the at least one web service. These tasks may be used once a version of the at least one web service and the other data are received. According to certain non-limiting embodiments of the present technology, this data may further be verified against databases of the web resource vulners.com, which may return information about potential vulnerabilities associated with the at least one web service. Finally, according to certain non-limiting embodiments of the present technology, the information about the vulnerabilities may be recorded in the database of network architecture elements.

The method 100 thus proceeds to step 110.

Step 110: Is an Other Network Architecture Element is Detected?

At step 110, according to certain non-limiting embodiments of the present technology, the processor may be configured retrieve results from scanning modules (such as the given scanning module 306) indicative of the identified vulnerabilities associated with the given network architecture element. Further, the processor may be configured to determine whether the results include any data indicative of at least one an other network architecture element associated with the given one. In other words, the processor may be configured to determine if at least one identified vulnerability associated with the given network architecture element provides access to the at least one an other network architecture element.

Further, according to certain non-limiting embodiments of the present technology, in response to receiving, form the given scanning module 304, the data indicative of the at least one an other network architecture element, the processor may be configured to identify further vulnerabilities associated therewith. To that end, in some non-limiting embodiments of the present technology, the processor may be configured to store the at least one an other network architecture element in the database of network architecture elements. Further, the processor may be configured to repeat at least some of the steps 102, 104, 104, 108, and 110 of the method 100 in respect of the newly identified, the at least one an other network architecture element, in order to identify further vulnerabilities associated therewith. By doing so, the processor may be configured to loop the method 100 back to the beginning thereof every time a new network architecture element is uncovered.

To that end, based on a type of the at least one an other network architecture element, in some non-limiting embodiments of the present technology, the processor may further be configured to apply a same predetermine task template, that is, the predetermined task template 200. However, in other non-limiting embodiments of the present technology, in order to determine further vulnerabilities associated with the at least one an other network architecture element, the processor may be configured to apply at least partially different predetermined task template (that is, another predetermined task template) from the predetermined task template 200.

By doing so, in certain non-limiting embodiments of the present technology, the processor may be configured to iteratively scan the network, selectively applying one of predetermined task templates depending on a specific type of a next network architecture element, to identify vulnerabilities associated therewith until no further vulnerability can be identified.

In some non-limiting embodiments of the present technology, the processor may be configured to use a decision tree for determining a sequence of tasks for scanning the network based on the at least one an other network architecture element and the given network architecture element. In these embodiments, the decision tree may split a given task for scanning a network architecture element into a sequence of tasks. Accordingly, by using the decision tree defining certain conditions for executing the tasks, the processor may be configured to selectively switch among scanning modules in the scanning system 300, whereby improved efficiency of the scanning system 300 may be achieved. In additional non-limiting embodiments of the present technology, the processor may be configured to use the decision tree for creating sequences of operations required to solve specific issues based on received data.

Accordingly, in some non-limiting embodiments of the present technology, the processor may be configured to generate predetermined task templates dynamically based on results rendered by execution of tasks associated with a previously used predetermined task template and newly identified network architecture elements.

The method thus proceeds to step 112.

Step 112: Generating an Intermediate Report Including Data of the at Least One Vulnerability According to certain non-limiting embodiments of the present technology, if, at step 110, the processor has not received any data indicative of the at least one an other network architecture element, at step 112, the processor may be configured to generate an intermediate report 308 including data of currently identified vulnerabilities on the network—that is, for example, the vulnerabilities associated with the given network architecture element. Further, the processor may be configured to cause task manager module 302 to switch to a waiting mode until any change associated with network architecture elements of the network occurs.

In some non-limiting embodiments of the present technology, irrespective of absence of the data indicative of the at least one an other network architecture element, the processor may be configured to generate, at each iteration of executing the method 100, the intermediate report 308 including the data of the currently identified vulnerabilities on the network. Accordingly, based on intermediate reports aggregated over a predetermined number of iterations of executing the method 100, the processor may be configured to generate a timeline of changes associated with the given network architecture element.

In certain non-limiting embodiments of the present technology, the processor may further be configured to present (for example, via outputting them on a computer screen) the intermediate reports to the operator of the scanning system 300 for further analyzing changes associated with network architecture elements—for example, how the structure of the given network architecture element has changed over time: new and deleted associated hyperlinks, changes in availability of services at a given IP address, changed associated subdomain names, and the like.

As mentioned earlier, in some non-limiting embodiments of the present technology, the intermediate reports including the data indicative of all currently identified vulnerabilities may be stored in the database of network architecture elements; in these embodiments, the data may include: all IP addresses, domain names, web sites and their URLs, and also all the discovered authorization options (if any valid passwords were discovered) as well as vulnerabilities in all associated network architecture elements.

Thus, certain embodiments of method 100 allow the scanning system 300 to operate continuously, that is, the search for further vulnerabilities on the network never stops. For example, if no new vulnerabilities have been identified on the network by a given moment in time using a given task, the scanning system 300 may be configured to intermittently re-execute the given task. As soon as a requested service would appear for a targeted network architecture element (and/or a new dependent service, which would be considered as an associated network architecture element), it will be analyzed using the given task. Prior art scanners known to the developers of the present technology typically run only once, provide a report on results without conducting additional searches. However, some of prior art scanners may optionally operate on a fixed schedule, that is, they may repeatedly scan for a network architecture element in question.

Accordingly, one of advantages of the present technology may be that that it can enable to monitor historical changes in data of the given network architecture element because at each iteration executed tasks and received results are recorded.

For example, let us consider a case where in a target subnet all SSH keys have been replaced at once. In response to this event, the scanning system 300 may be configured to conclude that the bulk replacement of the SSH keys may have been caused by a bulk re-installation of the OS, which may indicate an incident within this subnet. In another example: based on one or more intermediate reports, the scanning system 300 may be configured to register availability of a certain service, for example, once a week at certain time. The scanning system 300 may thus be configured to interpret this event as important because this behavior is likely to be related with backing up the system or similar activities.

In addition, the database of network architecture elements may also be configured to store a scanning frequency and time settings to look for new associated network architecture elements at a predetermined regularity. Also, in specific non-limiting embodiments of the present technology, the scanning frequency and the time settings may be set (or otherwise, modified) by the operator of the scanning system 300. Additionally, these settings may be stored in a respective predetermined task template for a specific network architecture element based on accumulated experience.

The examples below are given so as to illustrate the practice of various embodiments of the present disclosure. It is not intended to limit or define the entire scope of this disclosure.

EXAMPLES

The scanning system 300 may receive an URL http://site.com/auth/. The scanning system 300 then queries this URL to get basic information. At this stage, the scanning system 300 finds out that the web server responds to its query with the 401-response code (http basic auth). A brute force password mining task is created for this URL based on a predetermined task template for "http basic auth". When this task is executed, a valid username and password pair may be received (for example, admin: qwerty), these credentials are recorded in a respective intermediate report.

In another example, an URL http://site.com/ may be received as input data. The scanning system 300 then creates predetermined task templates configured to search for subdomains for *.site.com. At the scanning stage, the auth.site.com subdomain may be uncovered. It is then necessary to check if this subdomain is a website. In case this check is completed successfully, the scanning system 300 may further receive additional data at http://auth.site.com/. At this stage the scanning system 300 may receive, on a respective request, a response from a web server including a response code 401 (http basic auth). Then, just as in the previous example, a brute force password mining task is created for this URL based on the "http basic auth" predetermined task template. When this task is executed, a valid username and password pair may be received (for example, admin: qwerty), these credentials are recorded in a respective intermediate report. At the same time, certain tasks can be created to search for URL addresses, which may result in receiving a link http://auth.site.com/backup.zip.

Computing Environment

Figure 4:
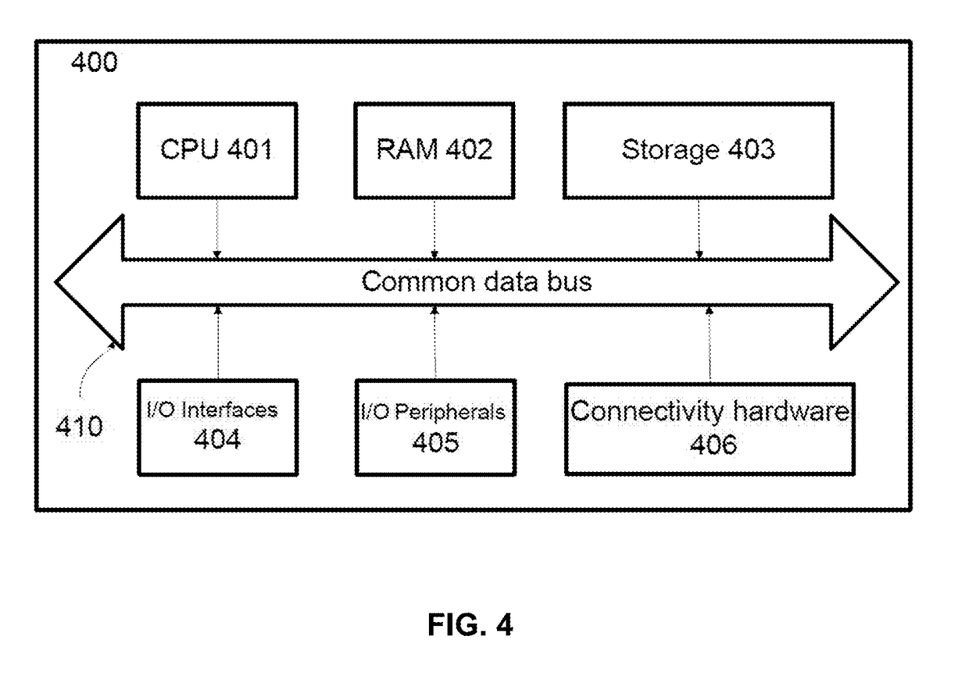
FIG. 4 depicts a schematic diagram of an example computing environment configurable for execution of the method of FIG. 1, in accordance with certain non-limiting embodiments of the present technology.

With reference to FIG. 4, there is depicted an example functional diagram of the computing device 400 configurable to implement certain non-limiting embodiments of the present technology.

In some non-limiting embodiments of the present technology, the computing device 400 may include: the processor comprising one or more central processing units (CPUs) 401, at least one non-transitory computer-readable memory 402, a storage 403, input/output interfaces 404, input/output peripherals 405, connectivity hardware 404.

According to some non-limiting embodiments of the present technology, the one or more CPUs 401 may be configured to execute specific program instructions the computations as required for the computing device 400 to function properly or to ensure the functioning of one or more of its components. The one or more CPUs 401 may further be configured to execute specific machine-readable instructions stored in the at least one non-transitory computer-readable memory 402, for example, those causing the computing device to execute one of the method 200 and the method 300.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures and other software elements.

The at least one non-transitory computer-readable memory 402 may be implemented as RAM and contains the necessary program logic to provide the requisite functionality.

The storage 403 may be implemented as at least one of an HDD drive, an SSD drive, a RAID array, a network storage, a flash memory, an optical drive (such as CD, DVD, MD, Blu-ray), etc. The storage 403 may be configured for long-term storage of various data, e.g., the aforementioned documents with user data sets, databases with the time intervals measured for each user, user IDs, etc.

The interfaces input/output 404 may comprise various interfaces, such as at least one of USB, RS232, RJ45, LPT, COM, HDMI, PS/2, Lightning, FireWire, etc.

The input/output peripherals 405 may include at least one of a keyboard, joystick, (touchscreen) display, projector, touchpad, mouse, trackball, stylus, speakers, microphone, and the like. A communication link between each one of the input/output peripherals 405 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The connectivity hardware 404 may be selected based on a particular implementation of the network 120, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of WAN, PAN, LAN, Intranet, Internet, WLAN, WMAN, or GSM networks.

These and other components of the computing device 400 may be linked together using a common data bus 410.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for determining vulnerabilities on a network, the method being executable by a processor, the method comprising:
receiving, by the processor, data indicative of a first network architecture element;
determining, by the processor, based on the data indicative of the first network architecture element, a respective one of a plurality of predetermined task templates, the respective one of the plurality of predetermined task templates including one or more tasks executable for identifying respective vulnerabilities associated with the first network architecture element;
in response to identifying, based on the respective one of the plurality of predetermined task templates, at least one vulnerability associated with the first network architecture element, the at least one vulnerability providing access to a second network architecture element associated with the first network architecture element:
determining, by the processor, data indicative of the second network architecture element;
storing, by the processor, the data indicative of the second network architecture element in a database; and
using, by the processor, the data indicative of the second network architecture element for identifying further vulnerabilities on the network.

2. The method of claim 1, wherein the first network architecture element is associated with a first network architecture element type comprising at least one of: an IP address, a website, a Uniform Resource Locator (URL), a domain name, and a network port.

3. The method of claim 2, wherein, if the first network architecture element type is the domain name, the method further comprises verifying, by the processor, availability of the domain name using a WHOIS web service.

4. The method of claim 3, wherein the method further comprises determining, by the processor, using the WHOIS web service, registration data associated with an owner of the domain name.

5. The method of claim 3, the verifying the availability of the domain name further comprises analyzing, by the processor, data responsive to requests for random subdomain names associated with the domain name.

6. The method of claim 2, wherein, if the first network architecture element type is the website, the method further comprises verifying, by the processor, availability of the website, the verifying comprising establishing a connection with the website, the connection being one of a direct connection and a connection via a proxy server.

7. The method of claim 2, wherein if the first network architecture element type is the URL, the method further comprises verifying availability of the URL, the verifying comprising transmitting, by the processor, at least one request to a webserver associated with the URL, and the verifying further comprising at least one of: analyzing a response code of a response received from the webserver associated with the URL; a content associated with the response; a header of the response; and a type of the URL, wherein the type of the URL is associated with one of a file, a directory, and underdetermined.

8. The method of claim 7, wherein the verifying the availability of the URL further comprises determining at least one of:
 if the URL is responsive to requests for non-existing files;
 if the URL is associated with a predetermined exclusion template;
 if the webserver associated with the URL is configured to redirect the at least one request to at least one an other URL, and determining the at least one an other URL.

9. The method of claim 1, wherein the data indicative of the first network architecture element is received from one of: a user input and the database.

10. The method of claim 1, wherein the the respective one of the plurality of predetermined task templates is associated with a plurality of network architecture element types, to which the respective one of the plurality of predetermined task templates is applicable.

11. The method of claim 10, wherein the one or more tasks comprise at least one of:
 tasks for identifying subdomain names;
 tasks for identifying URLs;
 tasks for identifying open network ports;
 tasks for retrieving information of at least one web service associated with the open network ports;
 tasks for password mining for accessing the at least one web service associated with the open network ports; and
 tasks for identifying vulnerabilities associated with the at least one web service.

12. The method of claim 1, further comprising:
 receiving, by the processor, the data indicative of the second network architecture element;
 determining, by the processor, based on the data indicative of the second network architecture element, an other one of the plurality of predetermined task templates,
  the other one of the plurality of predetermined task templates including one or more tasks executable for identifying respective vulnerabilities associated with the second network architecture element;
 in response to identifying, based on the other one of the plurality of predetermined task templates, at least one vulnerability associated with the second network architecture element, the at least one vulnerability providing access to a third network architecture element associated with the second network architecture element:
  determining, by the processor, data indicative of the third network architecture element;
  storing, by the processor, the data indicative of the third network architecture element in the database; and
  using, by the processor, the data indicative of the third network architecture element for identifying further vulnerabilities on the network.

13. The method of claim 12, further comprising iteratively repeating at least the steps of the receiving data and the determining a predetermined task template until no further vulnerability is identified.

14. The method of claim 13, further comprising generating, at each iteration, an intermediate report including data of vulnerabilities having been identified on the network.

15. The method of claim 12, wherein the other one of the plurality of predetermined task templates is a same as the respective one of the plurality of predetermined task templates.

16. The method of claim 12, wherein the other one of the plurality of predetermined task templates is at least partially different from the respective one of a plurality of predetermined task templates.

17. A system for determining vulnerabilities on a network, the system comprising a computing device, the computing device further comprising:
 a processor;
 a non-transitory computer-readable medium comprising instructions;
 the processor, upon executing the instructions, being configured to:
  receive data indicative of a first network architecture element;
  determine based on the data indicative of the first network architecture element, a respective one of a plurality of predetermined task templates,
   the respective one of the plurality of predetermined task templates including one or more tasks executable for identifying respective vulnerabilities associated with the first network architecture element;
  in response to identifying, based on the respective one of the plurality of predetermined task templates, at least one vulnerability associated with the first network architecture element, the at least one vulnerability providing access to a second network architecture element associated with the first network architecture element:
   determine data indicative of the second network architecture element;
   store the data indicative of the second network architecture element in a database; and
   use the data indicative of the second network architecture element for identifying further vulnerabilities on the network.

18. The system of claim 15, wherein the processor is further configured to:
 receive the data indicative of the second network architecture element;
 determine, based on the data indicative of the second network architecture element, an other one of the plurality of predetermined task templates,
  the other one of the plurality of predetermined task templates including one or more tasks executable for identifying respective vulnerabilities associated with the second network architecture element;
 in response to identifying, based on the other one of the plurality of predetermined task templates, at least one vulnerability associated with the second network architecture element, the at least one vulnerability providing access to a third network architecture element associated with the second network architecture element:
  determine data indicative of the third network architecture element;
  store the data indicative of the third network architecture element in the database; and
  use the data indicative of the third network architecture element for identifying further vulnerabilities on the network.

19. The system of claim 18, wherein the processor is further configured to iteratively repeat at least the steps of the receiving data and the determining a predetermined task template until no further vulnerability is identified.

20. The system of claim 19, wherein the processor is further configured to generate, at each iteration, an intermediate report including data of vulnerabilities having been identified on the network.

\* \* \* \* \*